F. E. BURNS.
PIPE CLEANER AND SPRAYER.
APPLICATION FILED AUG. 22, 1919.
1,351,368.
Patented Aug. 31, 1920.
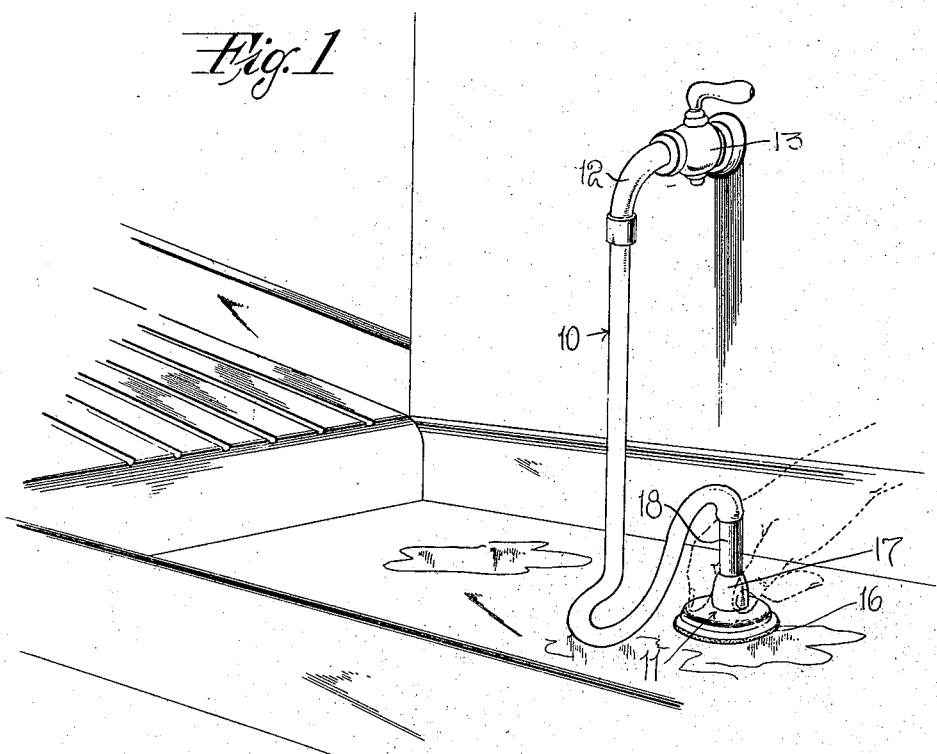
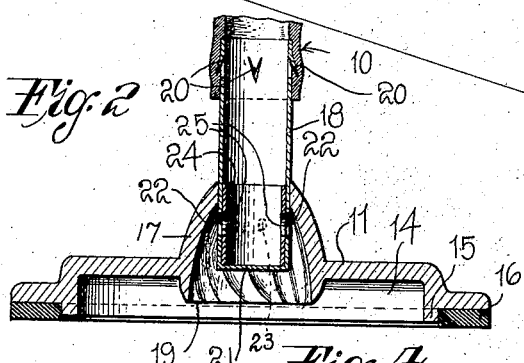
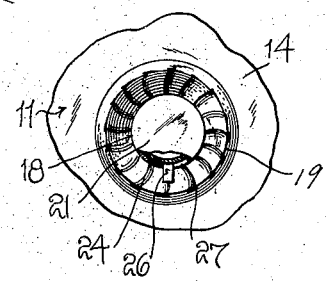
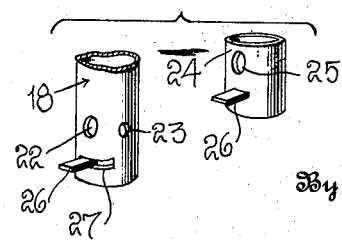
Inventor
F. E. Burns.
By Watson E. Coleman
Attorney

UNITED STATES PATENT OFFICE.

FRANCIS E. BURNS, OF LOS ANGELES, CALIFORNIA.

PIPE CLEANER AND SPRAYER.

1,351,368.   Specification of Letters Patent.   Patented Aug. 31, 1920.

Application filed August 22, 1919. Serial No. 319,146.

*To all whom it may concern:*

Be it known that I, FRANCIS E. BURNS, a citizen of the United States, residing at Los Angeles, in the county of Los Angeles and State of California, have invented certain new and useful Improvements in Pipe Cleaners and Sprayers, of which the following is a specification, reference being had to the accompanying drawings.

This invention relates to means for spraying water, and particularly to a device of this general character which may be used not only as a means for spraying water but as a means for cleaning out clogged drain pipes and waste pipes.

One of the objects of this invention is to provide a device of this character which may be attached to an ordinary faucet and which is so constructed that it may be placed over the outlet of a sink or the inlet of a drain pipe of any character, and which is further so constructed that the water from the faucet will be ejected in the form of a very strong swirling stream which will remove the matter clogging the drain or waste pipe.

A further object is to provide a construction of this character which may be also used as an ordinary sprayer.

And another object is to provide means whereby the size or strength of the stream ejected from the device may be controlled.

Other objects will appear in the course of the following description.

My invention is illustrated in the accompanying drawings, wherein:—

Figure 1 is a perspective view of a faucet with my pipe cleaner and sprayer attached to the faucet and in use;

Fig. 2 is a longitudinal diametrical sectional view through the pipe cleaner and sprayer;

Fig. 3 is a fragmentary under side plan view of the central portion of the sprayer head, the sleeve 18 being partly broken away;

Fig. 4 is a perspective view of the valve and sleeve separated from each other.

Referring to the drawings, it will be seen that my device comprises, generally speaking, a flexible pipe 10 and a head 11. The flexible pipe 10 is provided with the usual coupling of any suitable character 12, whereby it may be connected to a faucet 13 or connected to any other source of water under pressure.

The head 11 has a relatively large diameter, and the under face of the head is formed to provide a relatively shallow circular chamber 14, bounded by the annular wall 15, and exterior to this wall the head is recessed to provide for the reception of a gasket 16. The central portion of the head is formed with an upwardly extending boss 17, the inner face of this boss being slightly conical and the boss being provided with a central opening for the reception of a metallic, tubular section 18. The inner face of the head is also formed with an annular flange 19 coinciding with the wall of the boss 17, this flange extending downward into the chamber 14 and the inner face of the flange coinciding with the inner face of the boss and continuing it. The inner face of the conical boss 17 is formed with a plurality of spiral grooves to give a rotatory action to the water ejected through the boss.

The tubular member 18 at its upper end is formed to engage with the flexible pipe 10, and to this end I have provided the outwardly and downwardly projecting spurs 20 struck out from the tubular member 18. The lower end of this tubular member is closed, at 21, but above this lower end, the tubular member is provided with a plurality of relatively large, lateral openings 22, and intermediate these openings with a plurality of small openings 23. Disposed within the lower end of the tubular member 18 is a sleeve 24 which may be also closed at its lower end but is open at its upper end, this sleeve having perforations 25 in its side wall so spaced as to coincide with either the openings 22 or the openings 23. This sleeve is provided with an outwardly extending finger 26 which extends through a slot 27 formed in the tubular member 18. This slot is of such length that the finger may be shifted in one direction or the other sufficiently to carry the sleeve 24 into position where its openings 25 will register with the openings 23 or with the openings 22, as desired.

In the use of this device for the purpose of clearing out a waste pipe or sink outlet, for instance, as illustrated in Fig. 1, the head 11 is disposed over the opening of the sink, for instance, and held firmly pressed down against the bottom of the sink. The water is now allowed to flow from the faucet and this water is ejected through the openings 22 (or 23) through the perforations 25 of the sleeve 24, and the water striking the curved, inner face of the boss 17 is given a swirling or rotative motion so that the stream of water passing into the outlet pipe rotates and this rotation of the stream, combined with its force, will remove, I have found in practice, practically any material which has acted to clog the pipe or outlet. The force of this stream and its size may be controlled by shifting the sleeve 24, and thus if it is desired to reduce the stream, the sleeve is shifted to carry its openings 25 into register with the small openings 23. If it is desired to increase the stream, the sleeve is shifted to carry its openings 25 into register with the openings 22. As before remarked, when the water is forced through the openings 25 and 22 or 23, the stream of water comes in contact with the smooth, inner surface of the funnel-shaped boss 17 and is forced downward in a circular path by the water coming through the tube. The back pressure of water is resisted by the interior face of the boss, so that pressure is secured in the waste pipe that will remove any waste matter. The rotatory action given to the stream of water causes a great suction to be created in the waste pipe, leaving the waste pipe clean and permitting the waste pipe to be kept in perfect order with very little trouble.

Actual tests of this device have shown that it will open up waste pipes, even when completely obstructed. The same rotary action of the stream of water occurs when the device is used as a sprayer. Furthermore, the head 11 which is relatively wide in diameter furnishes a support for the sprayer when placed upon the ground, the distance from the center to the rim giving a proper rotation to the spray. This device has been found particularly desirable as a sprayer when spraying close to the sidewalk or parking, as there is no danger of wetting a passer-by. For a fine spray, the water is allowed to pass through the small opening or openings 23, and where a greater spray of water is desired, the water is allowed to pass through the larger openings 22. Of course, the water may also be controlled at the faucet.

While I have illustrated a certain form of my invention which I have found to be particularly effective, I do not wish to be limited to the exact construction illustrated, as it is obvious that the principle of the invention might be embodied in other forms without departing from the spirit thereof.

It will be noted that the flange 19 which forms the extension of the boss 17 does not extend to the base line of the head and this allows spreading of the water ejected into the sink so that the water will come in contact with all the openings in the sink plate or sprayer, thus avoiding the necessity of removing the latter. When the device is used as a sprayer, the flanges 15 and 19 prevent dripping of the water on the hand.

I claim:—

1. A spraying head comprising a head proper formed upon one face to provide a circular chamber and bounded by a wall, the center of the head being formed with an outwardly extending, slightly conical, hollow boss entirely open at its inner end, and a tubular member extending through the axis of the boss and closed at its inner end, the tubular member having perforations discharging against the inner face of the boss adjacent the smaller end of the boss.

2. A spraying head comprising a head proper formed upon one face to provide a circular chamber and bounded by a wall, the center of the head being formed with an outwardly extending, slightly conical, hollow boss, and a tubular member extending to the axis of the boss and closed at its inner end, the tubular member having perforations discharging against the inner face of the boss, and a regulating sleeve disposed within the tubular member and having perforations adapted to register with the perforations in the tubular member and being shiftable to control the passage through said perforations.

3. A spraying head comprising a head proper formed upon one face to provide a circular chamber and bounded by a wall, the center of the head being formed with an outwardly extending, slightly conical, hollow boss, and a tubular member extending to the axis of the boss and closed at its inner end, the tubular member having perforations discharging against the inner face of the boss, the perforations in the tubular member having different sizes, and a sleeve coacting with the tubular member and having perforations and being shiftable to carry its perforations into register with any of the perforations in the tubular member.

4. A spraying head of the character described comprising a body formed with an annular flange on its rim to thus provide a relatively shallow chamber on one face of the body and formed exterior of this chamber with an annular recess carrying a gasket, the center of the body being provided with a hollow boss, the interior of the boss flaring toward the chamber in the body and extending beyond the inner face of this chamber, and a tubular member entering axially through the boss and projecting thereinto and closed at its inner end, said tubular member adjacent the outer end of the boss being provided with perforations discharging against the inner face thereof, and means for regulating the discharge of water through said perforations.

5. A spraying head of the character described comprising a body formed with an annular flange on its rim to thus provide a relatively shallow chamber on one face of the body and formed exterior of this chamber with an annular recess carrying a gasket, the center of the body being provided with a hollow boss, the interior of the boss flaring toward the chamber in the body and extending beyond the inner face of this chamber, and a tubular member entering axially through the boss and projecting thereinto and closed at its inner end, said tubular member adjacent the outer end of the boss being provided with perforations discharging against the inner face thereof, and means for regulating the discharge of water through said perforations, the tubular member at its outer end being provided with means whereby it may be connected to a pipe.

6. A spraying head comprising a head proper formed upon one face to provide a circular chamber, the center of the head being formed with an outwardly extending, slightly conical, hollow boss, the inner face of which is spirally corrugated, the tubular member extending through the axis of the boss and closed at its inner end, the tubular member having perforations discharging against the inner face of the boss.

7. A spraying head comprising a head proper formed upon one face to provide a circular chamber having an annular, outer wall, the center of the head being formed with an outwardly extending, slightly conical, annular boss, the inner face of which is formed with spiral corrugations, and means for causing the discharge of water through said boss and against said spiral corrugations.

In testimony whereof I hereunto affix my signature in the presence of two witnesses.

FRANCIS E. BURNS.

Witnesses:
JOHN F. POOLE,
WILLIAM J. O'BRIEN.